Jan. 4, 1927.
C. G. HAWLEY
1,612,812
GAS PURIFIER
Filed May 4, 1925
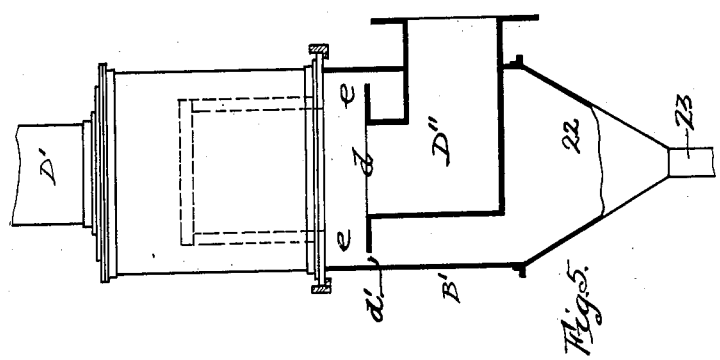
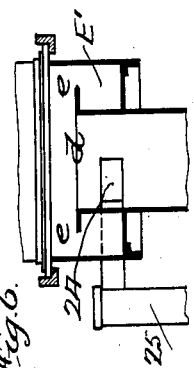
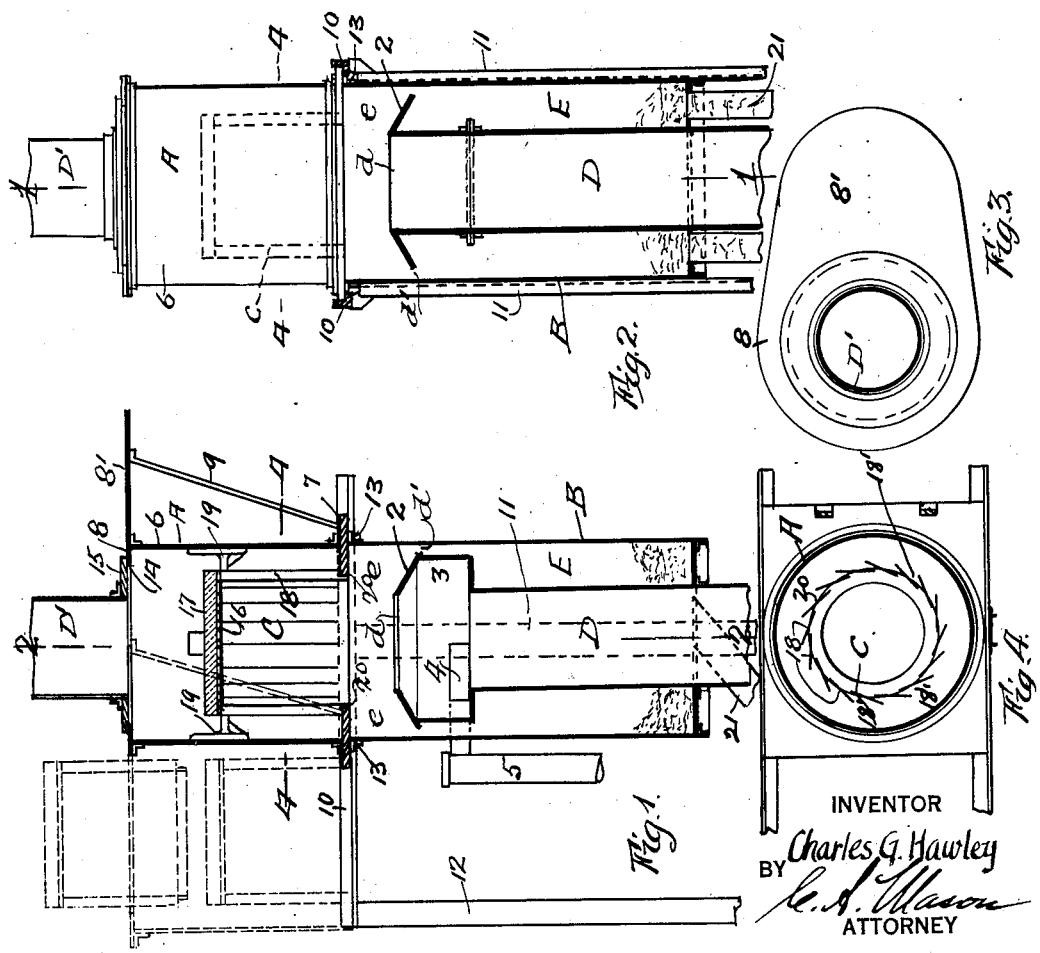
INVENTOR
Charles G. Hawley
BY
ATTORNEY Patented Jan. 4, 1927.

1,612,812

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

GAS PURIFIER.

Application filed May 4, 1925. Serial No. 27,840.

This invention relates to the purification of fluids generally, but will be described in its relation to the purification of furnace gas, producer gas and the like, from which the burden of dust should be removed before the gas is burned or otherwise utilized.

My invention will be quickly comprehended on reference to the drawings that form part of this specification; in which, Fig. 1 is a vertical section of a gas purifying device, or apparatus, embodying the invention, the section being substantially on the line 1—1 of Fig. 2; Fig. 2 is a vertical section on the line 2—2 of Fig. 1 but in one respect illustrates a modification of that structure; Fig. 3 is a top view of the gas purifier taken on the line 3—3 of Fig. 1; Fig. 4 is a horizontal section on the line 4—4 of Figs. 1 and 2; Fig. 5 illustrates a modified form of the apparatus; and Fig. 6 is a further modification thereof.

In its best form this gas purifier or cleaner comprises a top section A and a bottom section B, which may be readily separated. The top section contains the element C by which rotation is imparted to the downward flowing gas as about to be described. The bottom section contains not only the gas outlet pipe D, but also a dust collecting pocket E.

The gas from the supply pipe D' (at the top) encounters the element C and passing through the tangential tuyère thereof is set into such rapid rotation that the dust particles are centrifugally separated. Whirling downward the dust particles fly out into the space or race portion e and thence descend to the pocket E; the purified gas finding downward escape through the central opening d at the top of the stand-pipe D.

I may use a simple disk 2 to form the bottom of the race portion e, as shown in Fig. 2, or may provide for a secondary deposit of dust by means of the underlying circular race 3, as shown in Fig. 1. When used, the race 3 is provided with a tangential dust discharge nozzle 4 leading to a closed dust pocket 5.

The upper part A comprises a cylindrical shell 6, a rectangular base plate 7, and an oblong top plate 8, having a tail piece 8'. The latter is supported by a brace 9 stepped upon the plate 7. The margins of the rectangular plate 7 rest upon slide rails 10 and the latter find support on the columns 11 and 12. Incidentally the columns 11 may serve to support the weight of the whole device, being attached directly to the sides of the bottom portion B. The top of the member B is flanged at 13, and normally is bolted to the plate 7 which serves as the bottom flange for the shell 6.

The top plate 8 contains a central hole 14, large enough to admit the member C. Normally this hole is closed by the wide flange 15 on the lower end of the down-pipe D'. On removal of the bolts at top and bottom the member A may be slipped to one side, far enough to expose the hole 14 and permit the removal and replacement of the tuyère member C. Meantime, the tail piece 8' is thereby moved under the end of the pipe D', serving as a stop valve to shut off the flow of gas.

The tuyère barrel or ring C is composed of the top disk 16, (preferably guarded by a layer of brick 17) and a circumferential series of vertical, operatively overlapping tangential tuyère blades 18. (See Fig. 4.) The upper ends of the tuyère blades are fastened to the plate 16. That plate and the tuyère blades hang upon the detachable brackets 19, extending from the sides of the shell 6. The lower ends of the blades are suitably fastened together in series and the end of the tuyère as a whole passes through the correspondingly shaped hole 20 at the center of the plate 7. However, care is observed to keep the extreme lower end of the tuyère ring slightly above the end surface of the plate 7, not to interfere with the sliding of that plate across the flange 13 at the top of the member B.

The race portion e is of considerable height and the opening d is considerably smaller than the lower end of the tuyère ring. All of the described parts are non-rotative yet the dust-laden gases on entering the tangential tuyères 18' of the tuyère ring take on a rapid whirling motion within that ring. The dust is thereby centrifugally separated and as the body of gas whirls downward the dust is found upon the outer periphery of the whirling body, and on reaching expansion race e is centrifugally removed from the region of the gas outlet d. The whirling dust, finding no other escape, falls through the annular opening $d'$, surrounding the top ring 2 and is collected in the pocket E. Simultaneously the purified gas whirls downward through the opening $d$ and is carried away by the down-pipe D. If the secondary race 3 is employed there is sometimes an attendant recovery of very fine dust particles which might otherwise be carried away by the gas. The dust pocket E is emptied through the bottom spouts 21.

The described gas purifier is of no great size; it is extremely simple in construction; it is easy to open; and, it is extremely efficient in operation.

Fig. 5 illustrates a modified construction, in which the down-goer pipe $D''$ takes the form of an elbow and passes out through the side of the member $B'$. The advantage of this arrangement is that the dust pocket may terminate in a hopper bottom 22, having a single dust discharge spout 23.

Again, the lower member of the gas purifier may be modified, as shown in Fig. 6. As there shown it contains a very shallow dust pocket $E'$ and the whirling of the dust therein is taken advantage of to insure its discharge through a tangential dust nozzle 24 leading into the top of a closed dust pocket 25.

Having thus described my invention I claim as new and desire to secure by Letters Patent:—

1. A vertical shell having a mid-floor containing a central opening in combination with a fluid inlet at the top of said shell, a fluid outlet pipe of less diameter than said opening, said pipe defining a collection pocket in the base of said shell and rising centrally therein, and a tangential fluid whirling element in the upper part of said shell and discharging downwardly through the central opening in said floor; whereby the heavier substances are discharged into said pocket and the cleared fluid is discharged through said outlet pipe.

2. A vertical shell having a mid-floor containing a central opening, in combination with a fluid inlet at the top of said shell, a fluid outlet pipe of less diameter than said opening, said pipe defining a collection pocket in the base of said shell and rising centrally therein, an annular race formed in the top of said pipe, a tangential nozzle leading from said race through said shell, a tangential fluid whirling element in the upper part of said shell and discharging through the central opening in said floor; whereby the heavier substances are discharged into said pocket and the cleared fluid is discharged into said outlet pipe and caused to secondarily whirl in said race.

3. A vertical shell having a mid-floor containing a central opening in combination with a fluid inlet at the top of said shell, a fluid outlet pipe of less diameter than said opening, said pipe defining a collection pocket in the base of said shell and rising centrally therein nearly to said floor, thereby leaving a circumferential race space beneath the same, and a tangential tuyère element in the upper part of said shell and discharging downwardly through the central opening in said floor; whereby the fluid is set into rotation as it moves downwardly through the shell and is maintained in rotation across said space between the tuyère and the top of said outlet pipe.

4. A vertical shell having a mid-floor containing a central opening, in combination with a fluid inlet at the top of said shell, a valve structure for closing said inlet, a fluid outlet pipe of less diameter than said opening, said pipe defining a collection pocket in the base of said shell and rising centrally therein nearly to said floor, leaving a circumferential race space beneath the same, and a tangential tuyère element in the upper part of said shell and discharging downwardly through the opening in said floor; whereby the heavier components of the fluid are first discharged into said race space and thence deposited in said pocket while the cleared fluid departs through said pipe.

In testimony whereof I have hereunto set my hand this 30th day of April, A. D. 1925.

CHARLES GILBERT HAWLEY.